Feb. 16, 1960 S. VERNET 2,924,975
FLEXIBLE POWER ELEMENT
Filed June 3, 1957 2 Sheets-Sheet 1
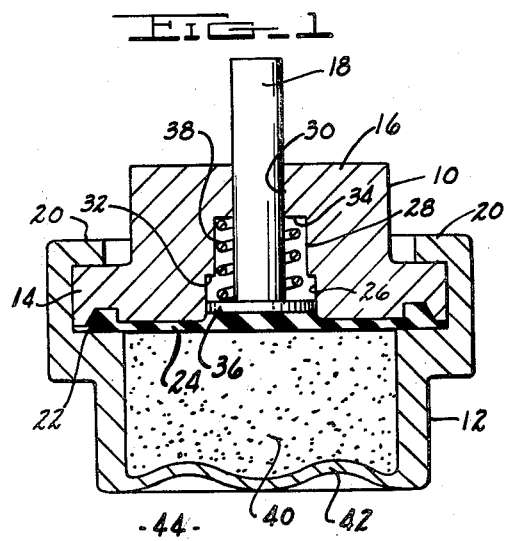
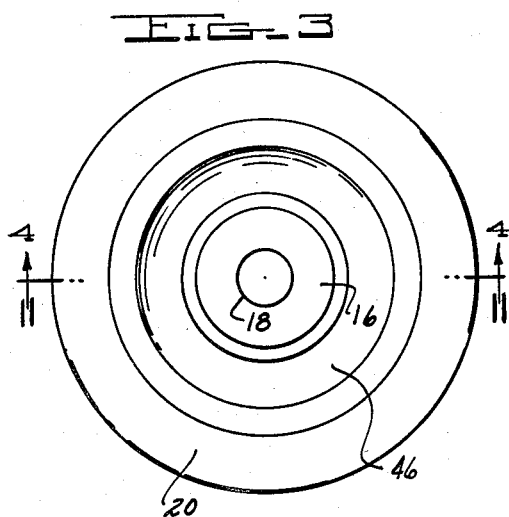
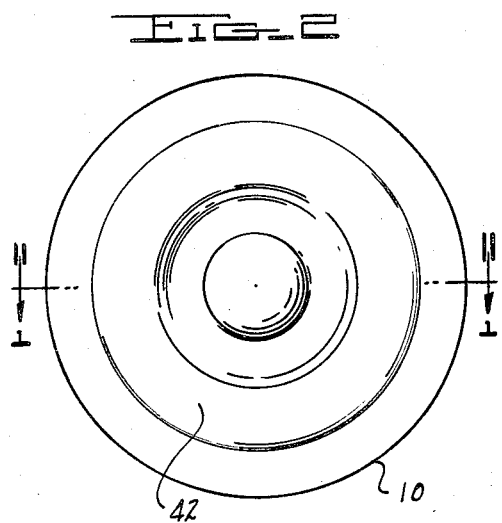
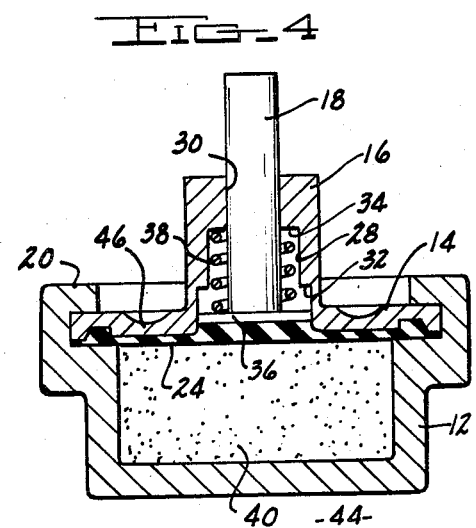
INVENTOR
SERGIUS VERNET
SMITH, OLSEN, LEWIS & McRAE
ATTORNEYS Feb. 16, 1960 S. VERNET 2,924,975
FLEXIBLE POWER ELEMENT
Filed June 3, 1957 2 Sheets-Sheet 2
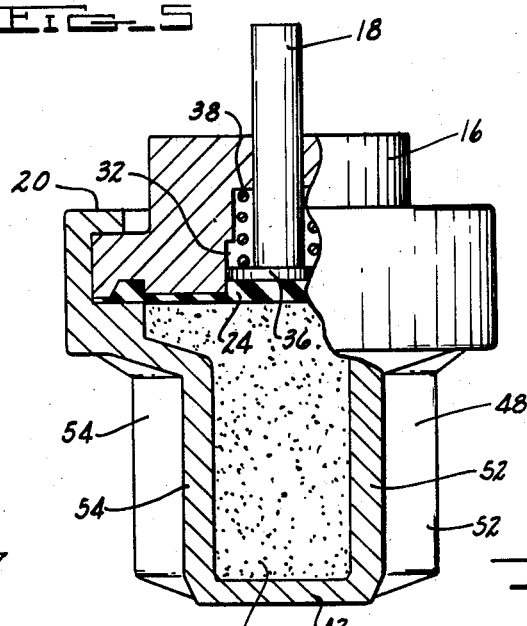
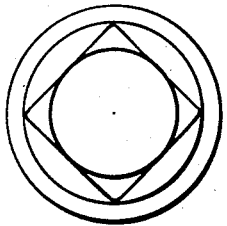
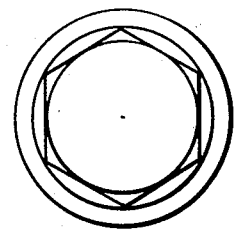
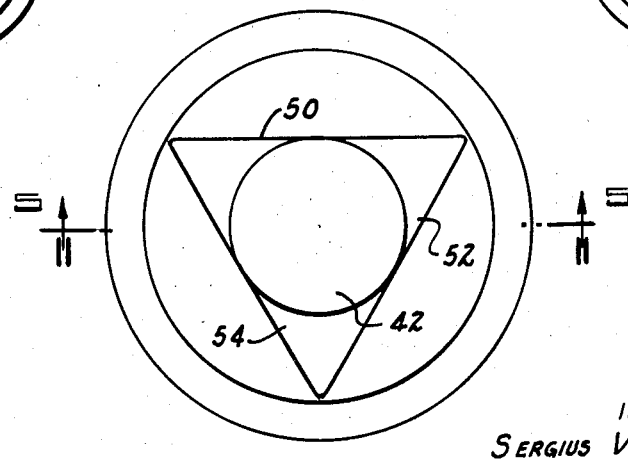
INVENTOR
SERGIUS VERNET
SMITH, OLSEN, LEWIS & McRAE
ATTORNEYS United States Patent Office 2,924,975
Patented Feb. 16, 1960

2,924,975
FLEXIBLE POWER ELEMENT
Sergius Vernet, Yellow Springs, Ohio
Application June 3, 1957, Serial No. 663,073
12 Claims. (Cl. 73—358)

This invention relates to power elements of the type wherein a pressure-producing material is contained within a casing having a movable wall or piston. The pressure-producing material may be a thermally expansible material such as material 16 in Fig. 1 of U.S. Patent No. 2,534,497, or the pressure-producing material may be a material introduced into the casing from a remote source as illustrated in Fig. 3 of U.S. Patent No. 2,534,497. Power elements of the above type have many uses, as for example in the actuation of valves and switches.

In operation of this type power element the internal pressures developed by the pressure material sometimes tend to move the piston further than the extent necessary to perform the "actuating" function; hence, in order to prevent parts damage it has been heretofore considered necessary in many cases to resiliently mount the power element on its supporting structure in such manner that it could move or "give" in the event of piston overtravel. Such resilient mounting of the power element materially increases its cost.

The primary object of the present invention is to provide a power element wherein the aforementioned costly resilient mounting structure is not required.

Other objects of this invention will appear in the following description and appended claims, reference being had to the accompanying drawings forming a part of this specification wherein like reference characters designate corresponding parts in the several views.

In the drawings:

Fig. 1 is a sectional view through one embodiment of the invention, taken on line 1—1 in Fig. 2.

Fig. 2 is a bottom plan view of the Fig. 1 embodiment.

Fig. 3 is a top plan view of a second embodiment of the invention.

Fig. 4 is a sectional view on line 4—4 in Fig. 3.

Fig. 5 is a view of another embodiment of the invention, taken partly in section on line 5—5 in Fig. 6.

Fig. 6 is a bottom plan view of the Fig. 5 embodiment.

Fig. 7 is a view in the same direction as Fig. 6 but of another embodiment of the invention.

Fig. 8 is a view in the same direction as Fig. 6 but of a further embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In Fig. 1 there is shown a power element comprising a casing 10. Casing 10 includes a metal cup 12 and a metal cover 14 having an integrally formed sleeve 16 for the movable mounting of a wall or piston 18. A peripheral flange portion 20 of cup 12 holds cover 14 in clamping position against the peripheral edge portion 22 of a rubber diaphragm 24. The construction of diaphragm 24 is preferably the same as that illustrated in Fig. 10 of U.S. Patent No. 2,636,776.

Sleeve 16 is provided with three aligned bores 26, 28 and 30, the junctures of which form two shoulders 32 and 34. Piston 18 is provided with an annular enlargement 36 which is in operative registry with shoulder 32. A force means in the form of a compression spring 38 is positioned between enlargement 36 and shoulder 34 so as to urge piston 18 inwardly toward cup 12.

In order to effect outward movement of piston 18 there is provided in cup 12 a pressure-producing material 40. Material 40 may be a thermally expansible material such as wax or paradichlorobenzene intermixed with finely divided heat conducting material such as copper or aluminum flakes.

It will be noted that end wall 42 of cup 12 is corrugated or wrinkled. The thickness of wall 42 is such that during normal operation of the power element no deformation of the corrugations takes place. Thus, as the temperature of ambient atmosphere 44 is increased and material 40 expands, piston 18 is moved outwardly of casing 10 without any deformation or movement of wall 42. However, after material 40 has expanded sufficiently to put enlargement 36 against shoulder 32 any further expansion of material 40 will be effective to increase the pressure of material 40 acting against wall 42. When the pressure of material 40 is sufficiently high, end wall 42 is deformed or deflected away from diaphragm 24 so as to increase the internal volume of cup 12 and thereby reduce or relieve the pressure of material 40. This deflecting action of wall 42 serves to prevent rupture or breakage of any of the power element parts. With the illustrated power element, end wall 42 deflects in a pressure range of from 1500 p.s.i. to 3000 p.s.i. Below a pressure of 1500 p.s.i. wall 42 remains rigid and "undeformable."

The Fig. 3 embodiment is similar in many respects to the Fig. 1 embodiment, and similar reference numerals are employed wherever applicable. In the Fig. 3 embodiment cover 14 is provided with an annular corrugation 46; whereby when enlargement 36 pressures against shoulder 32 and the pressure of material 40 is sufficiently elevated by temperature increase in atmosphere 44, the corrugated portion of cover 14 is caused to flex upwardly so as to relieve the pressure of material 40 and prevent parts breakage.

The Fig. 5 embodiment includes a cup 12 having three side wall portions 50, 52 and 54 integrally formed together to define a triangular annulus 48. In operation of the Fig. 5 power element; when enlargement 36 pressures against shoulder 32 and the temperature of ambient 44 is further increased to develop an increased internal pressure of material 40, wall portions 50, 52 and 54 are forced to bulge or deform outwardly. As the pressure of material 40 is further increased this "bulging" action tends to change annulus 48 from a triangular cross section toward a circular cross section, although such change in shape need not be complete for purposes of the invention. As annulus 48 changes from a triangular cross section toward a circular cross section the internal volume of cup 12 is automatically increased so as to relieve the pressure of material 40 and prevent parts breakage. The increase in internal volume is due to the fact that a circle has a lower "circumference to area" ratio than a triangle; as a result the cross sectional area of the space within annulus 48 is automatically increased as the annulus changes from a triangular cross section toward a circular cross section.

The embodiment shown in Figs. 7 and 8 are similar to the Fig. 5 embodiment except for the number of side portions in the cup annulus. In the Fig. 7 embodiment the cup annulus is provided with four side portions, and in the Fig. 8 embodiment the cup annulus is provided with six side portions. In both the Fig. 7 and Fig. 8 embodiments the cup annulus is deformable toward a cylindrical shape at elevated internal pressures in the same manner as annulus 48 in the Fig. 5 embodiment.

I claim:

1. A power element comprising a cup; a cover fixedly positioned across the mouth of said cup; said cover being provided with an opening; a piston movably positioned in said opening; pressure-producing material within said cup acting in a first range of pressures below a predetermined pressure to move said piston away from the end wall of the cup; at least one of said cover and cup being rigid up to said predetermined internal pressure but being deformable within its elastic limit in a second range of pressures above said predetermined pressure.

2. The combination of claim 1 wherein the end wall of the cup is corrugated so as to be deformable.

3. A power element comprising a cup; a cover fixedly positioned across the mouth of said cup; said cover including a sleeve extending away from the cup; a piston slidably positioned in said sleeve; said sleeve being formed with an internal shoulder, and said piston being formed with a shoulder in registry therewith; pressure-producing material within said cup acting in a first range of pressures below a predetermined pressure to move said piston shoulder toward said sleeve shoulder; at least one of said cover and cup being rigid up to said predetermined internal pressure but being deformable within its elastic limit in a second range of pressures above said predetermined pressure; whereby to prevent parts damage if said pressure-producing material should force the piston shoulder to exert a pressure on said sleeve shoulder in excess of said predetermined pressure.

4. A power element comprising a casing; a wall movably positioned in said casing; pressure-producing material within said casing acting in a range of pressures below a predetermined pressure to move said wall outwardly of the casing; stop means limiting said outward movement; said casing being rigid up to said predetermined internal pressure but being deformable within its elastic limit in a range of pressures above said predetermined pressure; whereby to prevent parts damage if said pressure-producing material should cause a pressure on said stop means in excess of said predetermined pressure.

5. A power element comprising a cup; a diaphragm extending across the mouth of the cup; a cover clamping the edges of said diaphragm against the cup; a sleeve extending from the cover away from the cup; said sleeve having a first bore of relatively large diameter in communication with the diaphragm, a second intermediate diameter bore extending axially from the outer limit of the first bore, and a third small diameter bore extending axially from the outer limit of the second bore; the juncture between the first and second bores forming a first shoulder, and the juncture between the second and third bores forming a second shoulder; a piston slidably positioned in said third bore and having an annular enlargement within the first bore in operative registry with said first shoulder; a compression spring encircling said piston and pressuringly engaging the second shoulder and annular enlargement; pressure-producing material within said cup acting against the diaphragm in a first range of pressures below a predetermined pressure to move the annular enlargement toward the first shoulder in opposition to the spring; at least one of said cover and cup being rigid up to said predetermined pressure but being deformable within its elastic limit in a second range of pressures above said predetermined pressure without rupture; whereby to prevent parts damage if said pressure-producing material should force the annular enlargement to exert a pressure on said first shoulder in excess of said predetermined pressure.

6. The combination of claim 5 wherein the end wall of the cup is corrugated so as to be deformable within the second pressure range.

7. A thermostatic power element comprising a casing having a movable wall; thermally expansible material within said casing acting on temperature increase to produce a range of pressures below a predetermined pressure for moving said wall relative to the casing; rigid stop means in the path of said movable wall for limiting the movement of said movable wall; said casing being rigid up to said predetermined pressure but being deformable within its elastic limit in a range of pressures above said predetermined pressure to accommodate expansion of the thermally expansible material taking place after said movable wall strikes the rigid stop means.

8. A thermostatic power element comprising a casing defining a chamber and guide structure; a pellet of solid thermally expansible material within the chamber; a piston slidably housed in the guide structure and subject to the expansive force of said pellet; stop means rigid with the guide structure and located in the path of the piston; whereby, on temperature increase said pellet expands to produce a first range of pressures on the piston below a predetermined pressure to move said piston against said stop means; said casing being rigid up to said predetermined pressure but being deformable within its elastic limit in a range of pellet pressures above said predetermined pressure.

9. A power element comprising a cup; a cover fixedly positioned across the mouth of said cup; said cover being provided with an opening; a piston movably positioned in said opening; pressure-producing material within said cup acting in a first range of pressures below a predetermined pressure to move said piston away from the end wall of the cup; said cover being corrugated, with the corrugations being rigid up to said predetermined pressure but being deformable within the elastic limit of the cover material in a second range of pressures above said predetermined pressure.

10. A power element comprising a cup; a cover fixedly positioned across the mouth of said cup; said cover being provided with an opening; a piston movably positioned in said opening; pressure-producing material within said cup acting in a first range of pressures below a predetermined pressure to move said piston away from the end wall of the cup; the side wall of said cup being formed as a polygonal annulus, with said side wall being rigid up to said predetermined pressure but being deformable within its elastic limit toward the shape of a cylindrical annulus when subject to pressures in a second range of pressures above said predetermined pressure.

11. A power element comprising a cup; a diaphragm extending across the mouth of the cup; a cover clamping the edges of said diaphragm against the cup; a sleeve extending from the cover away from the cup; said sleeve having a first bore of relatively large diameter in communication with the diaphragm, a second intermediate diameter bore extending axially from the outer limit of the first bore, and a third small diameter bore extending axially from the outer limit of the second bore; the juncture between the first and second bores forming a first shoulder, and the juncture between the second and third bores forming a second shoulder; a piston slidably positioned in said third bore and having an annular enlargement within the first bore in operative registry with said first shoulder; a compression spring encircling said piston and pressuringly engaging the second shoulder and annular enlargement; pressure-producing material within said cup acting against the diaphragm in a first range of pressures below a predetermined pressure to move the annular enlargement toward the first shoulder in opposition to the spring; said cover being corrugated, with the corrugations being rigid up to said predetermined pressure but being deformable within the elastic limit of the cover material in a second range of pressures above said predetermined pressure.

12. A power element comprising a cup; a diaphragm extending across the mouth of the cup; a cover clamping the edges of said diaphragm against the cup; a sleeve extending from the cover away from the cup; said sleeve having a first bore of relatively large diameter in communication with the diaphragm, a second intermediate diameter bore extending axially from the outer limit of the first bore, and a third small diameter bore extending axially from the outer limit of the second bore; the juncture between the first and second bores forming a first shoulder, and the juncture between the second and third bores forming a second shoulder; a piston slidably positioned in said third bore and having an annular enlargement within the first bore in operative registry with said first shoulder; a compression spring encircling said piston and pressuringly engaging the second shoulder and annular enlargement; pressure-producing material within said cup acting against the diaphragm in a first range of pressures below a predetermined pressure to move the annular enlargement toward the first shoulder in opposition to the spring; the side wall of said cup being formed as a polygonal annulus, with said side wall being rigid up to said predetermined pressure but being deformable within its elastic limit toward the shape of a cylindrical annulus when subject to internal pressures in a second range of pressures above said predetermined pressure.

References Cited in the file of this patent

UNITED STATES PATENTS

| | | |
|---|---|---|
| 783,518 | Gumz et al. | Feb. 28, 1905 |
| 1,102,566 | Besley | July 7, 1914 |
| 1,712,657 | Frankenberg | May 14, 1929 |
| 2,340,685 | Raney | Feb. 1, 1944 |
| 2,598,351 | Carter | May 27, 1952 |